Dec. 21, 1954  J. E. BEVINS  2,697,348
FUEL INDICATING SYSTEM
Filed June 29, 1949
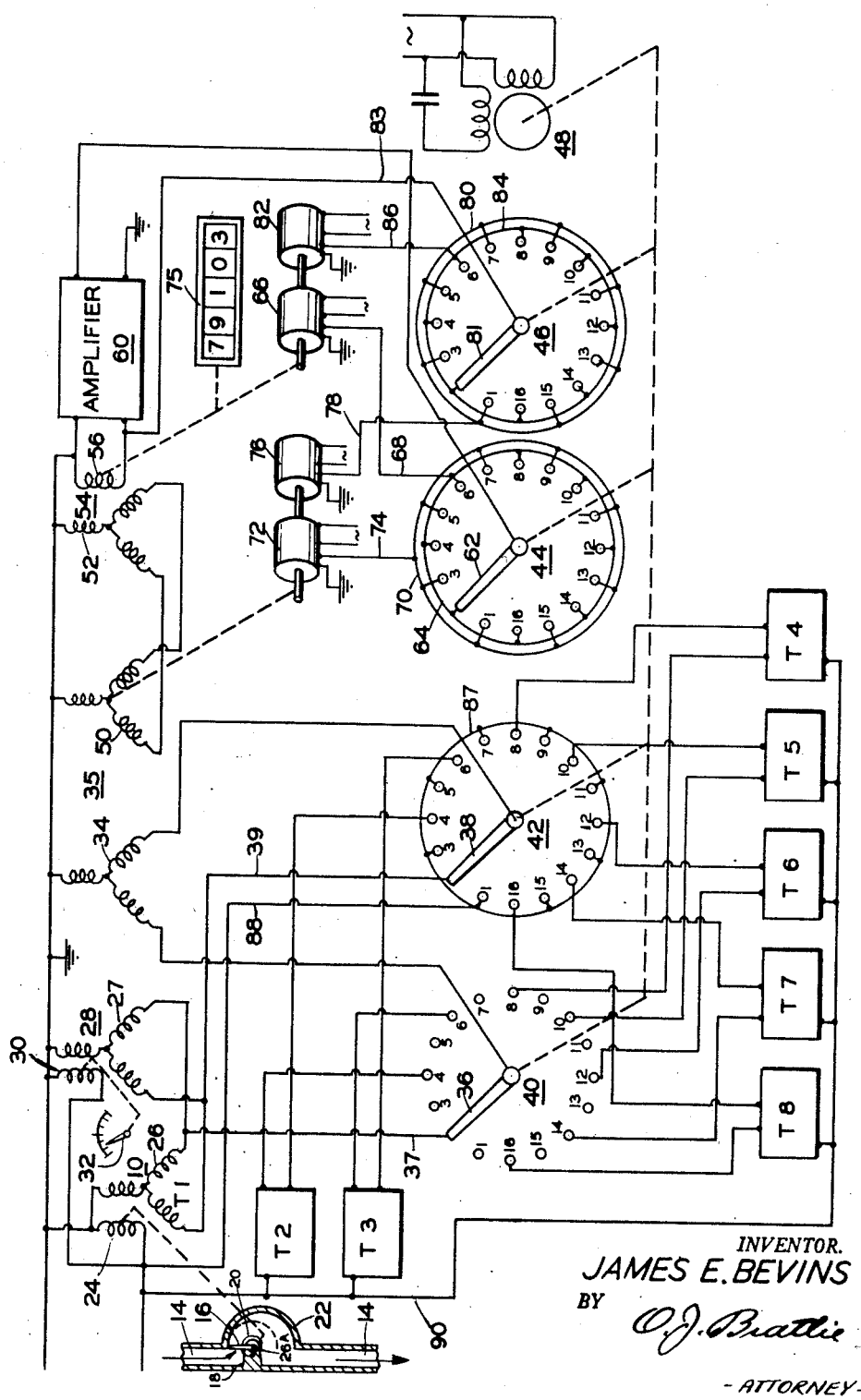
INVENTOR.
JAMES E. BEVINS
BY
O. J. Brattie
- ATTORNEY -

United States Patent Office 2,697,348
Patented Dec. 21, 1954

2,697,348

FUEL INDICATING SYSTEM

James E. Bevins, Ramsey, N. J., assignor to Bendix Aviation Corporation, Teterboro, N. J., a corporation of Delaware Application June 29, 1949, Serial No. 102,050

10 Claims. (Cl. 73—113)

The present invention relates to totalizing means and more particularly to novel means for totalizing fuel consumption of a plurality of engines feeding from a common fuel reservoir.

It is often desirable to have a continuous indication of the available fuel remaining in a fuel reservoir supplying a number of engines, and in aircraft such information is vitally important. Fuel totalizers dependent upon gauges responsive to fuel levels are generally inaccurate because the level indicated is seldom a measure of the quantity of fuel consumed or remaining in the tank. In order to obtain a fair approximation of the fuel remaining on the craft when level indicators are used, it is necessary to add up the known amount of fuel in the full tanks and then add thereto the estimated amount remaining in the fuel tank to which the engines are connected. Various means and methods have been proposed heretofore for totalizing the fuel consumed, but in order to determine the amount of fuel remaining, it was then necessary to subtract this amount from the amount of fuel initially in the tanks.

The present invention contemplates the provision of a novel device which will continuously measure the quantity of fuel consumed by each engine and to subtract this from an amount indicated on the face of a visual indicator, which amount was originally set to correspond to the quantity of fuel initially in the fuel tanks.

Accordingly, one object of the present invention is to provide a novel fuel totalizing system which overcomes the difficulties of fuel totalizers heretofore known.

Another object is to provide a novel totalizing system of general application, having the desirable features of simplicity, accuracy and reliability.

Another object is to provide novel means whereby the quantity of fuel passing through a plurality of fuel lines may be totalized.

A further object of the invention is to provide a novel fuel totalizing system which accurately provides a continuous indication of the total amount of fuel remaining in the fuel reservoir.

A still further object is to provide a novel system which periodically determines the rate of fuel flow through each of several fuel lines and subtracts from an indicated total the quantity of fuel passing through each line at the particularly indicated flow rate.

Still another object of the invention is to provide a novel system for use in a multiple engine aircraft, whereby the total amount of fuel remaining in the fuel tanks during flight may be continuously indicated.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for purposes of illustration and description only, and is not intended as a definition of the limits of the invention.

In the single figure of the drawing one embodiment of the invention is illustrated in terms of the application thereof to a multiple engine aircraft. In the illustrated embodiment, eight engines are shown which may be supplied with fuel from separate fuel tanks or from a common feeder line connected to the fuel reservoir of an aircraft, for example. According to the present invention, the rate of fuel flow through the feeder line to each engine is periodically determined and an amount corresponding to the quantity of fuel assumed to have flowed through the particular feeder line during the period since the last determination is subtracted from the reading on a counter which originally was set to indicate the total initial amount of fuel available to the engines either in terms of gallons or pounds of fuel, usually the latter.

For ideal condition the period between each determination should be infinitesimal, but for practical purposes it has been found that sufficient accuracy is obtained by determining the rate of fuel flow through each fuel line once every 30 seconds or so. This period may be increased or decreased depending on the accuracy desired, due regard being taken of course of the time constant of the individual components used. For use with the components illustrated herein a periodic determination of once every 16 seconds has been found satisfactory.

It will be apparent to those skilled in the art that this system may be used for a variety of purposes such as for aircraft, sea craft and shore installations and that by a slight modification this system may be made to indicate the quantity of fuel consumed rather than the quantity of fuel remaining in the tanks. For use with more than the eight engines illustrated, it is merely necessary to increase the number of contacts on the ganged switch used for successively connecting the fuel flow transmitter of each fuel line to the totalizer mechanism. Although the totalizer system is illustrated as measuring the fuel in terms of rate of fuel flow times the time elapsed between each determination, it should be obvious that fuel consumption by each engine may also be measured directly by conventional flow meters.

For a better understanding of the invention, reference is now had to the single figure of the drawing wherein 10 indicates generally an inductive device associated with a flow meter 12 inserted in a fuel line 14. The flow meter 12 may be of any convenient type and for the sake of illustration a vane type flow meter is shown comprising a vane 16 hinged to support 18 and adapted to swing along an arc indicated by dotted lines under the force of fuel passing through the fuel line. In the position shown the vane effectively closes off the fuel line and is biased to this position by a helical spring 20. As soon as fuel begins to flow through the line, the vane will be displaced from this initial position by an angle proportional to the rate of fuel flow through the line because the casing 22 is eccentric with respect to the path of the vane as shown to provide an opening between the vane and the casing which increases proportionally with the angular displacement of the vane.

Rotor element 24 of inductive device 10 is connected to shaft 26A of vane 16 so as to be rotated therewith and displaced with respect to stator 26 by an amount corresponding to the angular displacement of the vane and hence the rate of fuel flowing through line 14.

Rotor 24 is connected across a source of A. C. power and is positioned with respect to stator 26 so as to be at null position with respect thereto when vane 16 is in initial position with no fuel flowing through the line. When the vane is displaced due to fuel flow, rotor 24 is displaced a corresponding amount and a voltage proportional to such displacement is induced in stator 26.

Stator 27 of repeater 28 is connected in parallel to stator 26 and rotor 30 thereof which is also excited from the source of A. C. power is displaced by an amount corresponding to the displacement of rotor 24 and such displacement is recorded on the fuel indicator 32 which may be mounted at a point remote from inductive device 10. It may be found convenient to mount the inductive device 10 directly on the casing of flow meter 13 so that rotor shaft 26, movable with vane 16, carries rotor 24. Meter 12 and inductive device 10 may be termed a transmitter for transmitting a signal indicating the position of the vane 16 and hence fuel flow through fuel line 14.

Stator 34 of differential inductive device 35 is parallel connected to stator 26 through contact arm 36 of switch 40 and lead 37 and through contact arm 38 of switch 42 and lead 39, respectively, with the contact arms in contact position 2 as shown. Switches 40, 42, 44 and 46 are ganged together and driven from a constant speed motor 48.

Rotor element 50 of differential inductive device 35 is parallel connected to stator element 52 of inductive device 54 whose rotor 56 is coinnected across the input of an amplifier generally indicated by a box 60 and may be of any conventional design well known in the art. The output of amplifier 60 is connected to contact arm 62 of switch 44. The even numbered contacts of switch 44 are connected together by a bus bar 64 which is connected to the control winding of a motor 66 by a lead 68. The odd numbered contacts of switch 44 are connected together by a bus bar 70 and to the control winding of motor 72 by a lead 74. The output of motor 66 is coupled to rotor 56 of inductive device 54 and to a subtraction counter 75, and the output of motor 72 is coupled to rotor 50 of inductive device 35.

A rate generator 76 is coupled to motor 72 and the output thereof is connected across the input of amplifier 60 through lead 78, bus bar 80 connecting together the odd numbered contacts of switch 46, contact arm 81 and lead 83. A rate generator 82 is similarly coupled to motor 66 and the output thereof is connected to bus bar 84 which interconnects the even numbered contacts of switch 46, through a lead 86.

The odd numbered contacts of switch 42 are connected together by a bus bar 87 which is connected to one side of the A. C. power supply through a lead 88.

The multiple flow totalizer illustrated in the drawing is shown as applied to a craft having eight separate fuel lines, each supplying fuel to one engine. A transmitter similar to the one illustrated in connection with fuel line 14 and generally indicated as T1 is associated with each of these fuel lines and for the sake of clarity these transmitters have been illustrated by boxes identified as T2, T3, T4, T5, T6, T7 and T8, respectively. Each such transmitter is provided with an inductive device similar to inductive device 10 and has a rotor thereof excited from the common source of A. C. supply connected to the transmitters through lead 90. Each transmitter has connected therewith a visual indicator similar to indicator 32 so that the operator or engineer may at a glance determine the amount of fuel flowing to each engine and thus be advised whenever any abnormal fuel consumption occurs. One lead from each transmitter corresponding to lead 37 from transmitter 10 is connected to successive even numbered contacts on switch 40 and one lead from each transmitter corresponding to lead 39 from transmitter 10 is connected to successive even numbered contacts on switch 42.

Coming now to the operation of the above described device it will be assumed that it is applied to a craft having eight engines supplied from a common source of fuel supply and that it is desired to have available a visual indicating device which will at all times show the exact amount of fuel remaining in the craft's fuel tanks either in terms of gallons or pounds of fuel. Weight being an important factor in aircraft operations it may be found convenient to measure the fuel in terms of weight.

For this purpose there is provided a counter 75 which may be set initially either by manual manipulations or by being connected to the intake fuel line of the craft so as to add to the indicated amount of fuel left in the fuel tanks an amount corresponding to the quantity of fuel taken on board so that the counter will indicate the exact quantity of fuel in the craft before take-off either in terms of gallons or pounds. It is now desired to reduce this initial setting of the counter as the fuel is consumed to indicate the quantity of fuel remaining. According to the present invention this is accomplished by connecting the transmitter associated with one of the fuel lines to stator 34 of differential inductive device 35 through switches 40 and 42 thereby causing a displacement voltage corresponding to the rate of fuel passing through the particular fuel line in question to be induced in rotor 50 and repeated in stator 52 and rotor 56 of inductive device 54. This signal is fed to amplifier 60 whose output is connected to motor 66 when the contact arms of the switches are in an even numbered contact position such as shown in the drawing. This will energize motor 66 to displace rotor 56 until it is at null with respect to the signal appearing in stator 52.

Simultaneously with displacing rotor 56 the motor will also subtract from the total indicated on counter 75 an amount corresponding to the quantity of fuel which will have flowed through line 14 during a certain period of time at the particular rate of fuel flow indicated by displacement of rotor 56. The time interval that the fuel flow is assumed to have been constant should ideally be infinitesimal but as a practical matter it has been found that the present system will obtain an acceptable accuracy for most purposes by sampling or recording the rate of fuel flow through one particular fuel line, about once every 16 seconds.

Constant speed motor 48 drives ganged switch 40, 42, 44 and 46. For the purpose of illustrating the principle of operation of the illustrated system it will be assumed that motor 48 rotates at such a speed either directly or through a reduction gearing as to cause contact arms of the switches to make one complete revolution in 16 seconds. This means that the rate of fuel flow through each fuel line is determined once every 16 seconds. Counter 75 is calibrated so as to subtract from the existing reading an amount corresponding to the weight of fuel in pounds which has passed through the particular fuel line in question in 16 seconds at the rate indicated by the displacement of rotor 56 which in turn is a direct function of the displacement of vane 16 of flow meter 12. In order to cause rotor 56 to stop at the exact null position with respect to stator 52 a follow-up device or rate generator 82 is provided which is coupled to motor 66 and which will generate a voltage proportional to the rate of change of speed of the motor at the input of amplifier 60 through lead 86, bus bar 84, contact arm 81 and lead 83. The voltage generated by the follow-up device will oppose the voltage induced in rotor 56 from stator 52 in a well known manner.

After the contact arms of switches 40, 42, 44 and 46 have been in position 2 as indicated in the drawing for approximately one second they will be moved over to contact 3. It will be noted that in this position transmitter 10 will be disconnected from the differential inductive device 35 and that A. C. supply voltage will be connected across stator 34 through lead 88, bus bar 87 and contact arm 38. Simultaneously, motor 66 and follow-up device 82 will be disconnected from the output and input of the amplifier 60, respectively. Motor 72 will now be connected to the output of amplifier 60 through lead 74, bus bar 70 and contact arm 62, and the output of follow-up device 76, coupled to motor 72 will be connected across the input of amplifier 60 through lead 78, bus bar 80, contact arm 81 and lead 83.

Due to the displacement of rotor 56 relative to stator 52 of inductive device 54, a signal will be induced in the rotor when stator 34 of inductive device 35 is excited from the A. C. source. The resulting amplified signal across the output of amplifier 60 will cause motor 72 to displace rotor 50 relative to stator 34 until the space vector in rotor 50 and hence in parallel connected stator 52 has reached such a position as to compensate for the previous displacement of rotor 56.

Follow-up device 76 prevents overtravel of rotor 50 in the usual manner by generating an opposing signal across the input of the amplifier 60. To thus position rotor 50 relative to stator 34 with the stator excited from the line voltage, the system is effectively reset to a reference position without changing the position of rotor 56. It will be apparent that the system can be reset by returning rotor 56 to null position, but this would entail a unidirectional drive between motor 66 and counter 75 with the consequent inherent lost motion in such a drive or a specially designed counter. By the above described method the system is reset without motion of components connected to the counter. It will be noted that the system is similarly reset every time the contact arms of switches are in an odd numbered contact position.

When the contact arms move to position 4, motor 66 and follow-up device 82 are again connected to the output and input, respectively, of amplifier 60 and the output of transmitter T2 is now connected to stator 34 through contact arms 36 and 38 of switches 40 and 42, respectively. Rotor 56 will be displaced by an amount corresponding to the displacement of the flow meter vane of transmitter T2 corresponding to vane 16 of flow meter 12 and the amount showing on the counter will be reduced by an amount corresponding to the weight of the fuel flowing through the fuel line associated with transmitter T2 at a rate corresponding to the displacement of rotor 56 during the time interval from when transmitter T2 was last connected, or in the instant illustration, for 16 seconds. When the contact arms move to contacts 5, A. C. supply voltage is again connected across stator 34 to reset the system to the line phase or reference position.

In this manner the transmitters are connected one at a time to the differential inductive device 35 to subtract from the reading on the counter an amount corresponding to the weight of fuel which has flowed through the fuel line associated therewith during the time since it was last connected, the system being reset between each connection.

Although only one embodiment of the invention has been illustrated and described in detail, it is to be expressly understood that the invention is not limited thereto. Various changes may be made in the design and arrangement of the parts without departing from the spirit and scope of the invention as the same will now be understood by those skilled in the art.

What is claimed is:

1. A totalizer system for continuously indicating the average amount of fuel used or remaining in a craft's fuel reservoir means supplying fuel through a plurality of fuel lines at variable rates of flow which may differ for each fuel line, comprising a transmitter associated with each fuel line for transmitting signals indicative of the fuel flow through each of said lines, a receiver connected to said transmitters to effect variable output signals, a visual indicator initially set to read the quantity of fuel available driving means connected to said indicator and responsive to said output signals for subtracting from such reading an amount depending on the magnitude of the transmitted signals, means for successively connecting said transmitters to said receiver to successively cause a subtraction from the subsisting reading of said indicator corresponding to the signal of the particular transmitter connected to the receiver, and means for resetting said receiver to a reference between each successive connection of said transmitters thereto.

2. In a totalizing system for multiple engine aircraft whose engines are supplied through fuel lines from a common fuel reservoir, a flow meter in each fuel line, a transmitter connected to each flow meter generating a signal across the output thereof proportional to the rate of flow through the line as sensed by the flow meter, a receiver comprising an inductive device having relatively movable stator and rotor elements, an amplifier connected to said rotor element, a counter, a motor connected to the output of said amplifier and coupled to said counter and to said rotor element of said inductive device, continuously rotating switch means for connecting said transmitter outputs to said receiver in a predetermined sequence thereby successively causing energization of said motor to change the reading of the counter by an amount dependent upon the received signal and corresponding to the quantity of fuel passing through each fuel line at the indicated rate during the interval between consecutive connections of each transmitter, and means for resetting the system to a reference position between each connection.

3. In a totalizing system for multiple-engine aircraft whose engines are supplied through fuel lines from reservoir means, the combination comprising a flow meter associated with each fuel line for indicating the rate of fuel flow therethrough, a transmitter for each fuel line responsive to the operation of the associated flow meter to develop across the output of said transmitter a signal proportional to the rate of flow through the associated fuel line, receiving means including an inductive device having relatively movable rotor and stator elements, continuously operating switch means for coupling said transmitter outputs in a predetermined sequence to said receiving means to unbalance said device and produce unbalance signals, a subtraction counter displaying a reading corresponding to the quantity of fuel remaining on the craft, and a motor coupled to said counter and to said rotor element of said device, said motor being operative in response to said unbalance signals to displace said rotor element to a null position with respect to the stationary element and simultaneously causing an amount corresponding to the quantity of fuel passing through the fuel line associated with the particular transmitter coupled to said receiving means at the time at the indicated rate during the time interval between consecutive connections of each transmitter, to be subtracted from the reading on said counter, and means for resetting said receiving means to a reference condition after each transmitter has been coupled thereto and before the next successive transmitter is coupled thereto.

4. In a totalizing system for a multiple-engine craft having a fuel line leading to each engine from a fuel reservoir means for obtaining a continuous reading of the fuel remaining in said reservoir means, the combination comprising a flow meter adapted to be associated with each fuel line, a transmitter associated with each flow meter and responsive to the operation of said flow meter and the fuel flow through the associated fuel line to transmit a signal as a function thereof, receiving means, means for coupling said transmitters successively to said receiving means at predetermined time intervals, a visual indicator displaying a reading corresponding to the quantity of fuel remaining in the fuel reservoir means, driving means coupled to said indicator and energized from said receiving means for subtracting from said reading an amount corresponding to the quantity of fuel having passed through the fuel line associated with the particular transmitter coupled to said receiving means at the time during the said time interval whereby said reading of said indicator is reduced successively and periodically by an amount corresponding to the quantity of fuel having flowed through each line during said time interval, and means for resetting said receiving means to a reference condition after each transmitter has been coupled thereto and before the next successive transmitter is coupled thereto.

5. In a totalizing system for a multiple-engine craft having a fuel line leading to each engine, the combination comprising a rate-of-flow meter adapted to be inserted in each fuel line to sense the fuel flow therethrough, an inductive transmitter having relatively displaceable primary and secondary winding means connected to each of said flow meters so that said winding means are relatively displaced in response to operation of the respective flow meter, a visual indicator, receiving means including an inductive device having relatively displaceable primary and secondary winding means, means for repeatedly coupling the secondary winding means of successive transmitters to the primary winding means of said inductive device to induce in the secondary winding means of said device a signal as a function of the fuel flow through the particular fuel line with which the momentarily connected transmitter is associated, driving means operatively responsive to said induced signal for changing the reading of said indicator by an amount corresponding to the quantity of fuel which will have passed through said particular fuel line during the time interval since the transmitter associated therewith was last coupled to said receiving means at the rate sensed by the rate-of-flow meter in said particular fuel line, and means for resetting said receiving means to a reference condition after each transmitter has been coupled thereto and before the next successive transmitter is coupled thereto.

6. In a totalizing system for a multiple-engine craft wherein the fuel line to each engine is provided with means for sensing the fuel flow therethrough, the combination comprising an inductive transmitter adapted to be associated with the flow-sensing means for each fuel line for transmitting a signal in response to the rate of fuel flow through said line, a counter, receiving means including an inductive device having relatively movable stator and rotor windings, a motor connected to the output of said receiving means for operating said counter in response to signals received by said receiving means, means for successively and continuously at spaced intervals coupling the output of each transmitter to said receiving means to cause said motor to change the reading of said counter by an amount corresponding to the quantity of fuel passing at the sensed rate through the line associated with the transmitter coupled to the receiving means during the time interval since it was last coupled thereto, and means for resetting said receiving means to a reference condition after a transmitter has been coupled thereto and before a successive transmitter has been coupled thereto.

7. In a totalizing system for continuously indicating the quantity of fluid used or remaining in reservoir means by determining the variable quantity of fluid having flowed from the reservoir means through each of a plurality of conduits during a predetermined period of time, each conduit being provided with means for sensing the flow therethrough, the combination comprising a plurality of inductive transmitters each adapted to be associated with the flow-sensing means for a respective conduit to develop in the output of the transmitter a signal which is a function of the fluid flow through its associated conduit, an indicator, receiving means including an inductive device having relatively displaceable primary and secondary winding means, means for periodically and successively coupling the outputs of said transmitters to the primary winding means of said device to develop in the secondary winding means of said device a signal which is a function of the fluid flow through the particular conduit with which the momentarily connected transmitter is associated, driving means responsive to said signal for changing the indication of said indicator by an amount corresponding substantially to the quantity of fluid which will have passed through said particular conduit during said predetermined period of time since the momentarily connected transmitter was last coupled to said receiving means, and means for resetting said receiving means to a reference condition after a transmitter has been coupled thereto and before a successive transmitter is coupled thereto.

8. In a totalizing system for continuously indicating the total quantity of fluid used or remaining in reservoir means which supply fluid at varying rates through a plurality of conduits wherein each conduit is provided with means for sensing the flow therethrough, the combination comprising an inductive transmitter adapted to be associated with the flow-sensing means for each conduit for transmitting a signal in response to the rate of fuel flow through its associated conduit, a totalizer indicator, a receiver including an inductive device having relatively movable stator and rotor windings, a motor coupled to the output of said receiver for operating said totalizer indicator in response to signals received by said receiver, means for successively and repeatedly at spaced intervals coupling each transmitter to said receiver to cause said motor to change the reading of said totalizer indicator by an amount corresponding substantially to the quantity of fluid passing at the sensed rate through the conduit associated with the transmitter coupled to the receiver during the time interval since it was last coupled thereto, and means for restoring said receiver to a reference condition after a transmitter has been coupled thereto and before a successive transmitter is coupled to said receiver.

9. In a totalizing system for continuously indicating the average amount of fluid used or remaining in a reservoir by determining the quantity of fluid having flowed from the reservoir through a plurality of conduits during a predetermined period, the combination comprising a flow-responsive device adapted to be associated with each conduit, a plurality of transmitters each of which is actuated by its associated flow-responsive device to develop a signal as a function of the flow through its associated conduit, receiving means including an inductive device having relatively movable primary and secondary winding means and adapted to have its primary winding means coupled to each of said transmitters for producing a variable output unbalance signal as a function of the fluid flow through the associated conduit when the movable winding means of said device is not at a null position with respect to the stationary winding means of said device, means for periodically and successively coupling said transmitters to the primary winding means of said device, driving means drivably connected to the movable winding means of said device and controlled by said variable unbalance signal for driving the movable winding means of said device to a null position with respect to the stationary winding means and for producing an indication of the flow through the conduit associated with the particular transmitter coupled to said receiving means at the time, and means for resetting said receiving means to a reference condition after a transmitter has been coupled thereto and before a successive transmitter is coupled thereto.

10. In combination, a transmitter inductive device for developing a signal voltage corresponding to a condition existing at a predetermined point, an intermediate inductive device having primary and secondary winding means, one of said winding means being stationary and the other of said winding means being movable relative to said stationary winding means, said primary winding means being adapted for connection to said transmitter to receive said signal voltage, a receiver inductive device having primary and secondary winding means, one of said winding means of said receiver device being stationary and the other of said winding means of said receiver device being movable relative to said last-mentioned stationary winding means, said receiver device having the primary winding means thereof adapted for connection to the secondary winding means of said intermediate device to produce an output signal voltage when the movable winding means of said receiver device is not in a balance position with respect to the stationary winding means thereof, a first motor connected to the secondary winding means of said receiver device, said motor being responsive to said output signal voltage from said receiver device and drivably connected to the movable winding means of said receiver device for displacing said last mentioned movable winding means to a balance position with respect to said stationary winding means of said receiver device so that said output signal is decreased to zero, a second motor drivably connected to the movable winding means of said intermediate device, means operative after a predetermined interval of time following operation of said first motor for disconnecting said transmitter device from said intermediate device and for applying a reference signal voltage to said intermediate device whereby a control signal voltage is developed across the secondary winding means of said receiver device, and means for disconnecting the secondary winding means of said receiver device from said first motor and connecting said second motor to the secondary winding means of said receiver device to receive said control signal voltage for displacing the movable winding means of said intermediate device to reduce said control signal to zero.

References Cited in the file of this patent

UNITED STATES PATENTS

| Number | Name | Date |
| --- | --- | --- |
| 1,823,960 | Troutman | Sept. 22, 1931 |
| 2,039,404 | Green et al. | May 5, 1936 |
| 2,151,941 | Rydberg | Mar. 28, 1939 |
| 2,414,086 | Brewer | Jan. 14, 1947 |
| 2,420,539 | Hornfeck | May 13, 1947 |
| 2,500,585 | Sylvander | Mar. 14, 1950 |

FOREIGN PATENTS

| Number | Country | Date |
| --- | --- | --- |
| 464,072 | Great Britain | Apr. 12, 1937 |